United States Patent

Matsuo

(10) Patent No.: US 8,179,065 B2
(45) Date of Patent: May 15, 2012

(54) POSITION SENSORLESS CONTROL OF PERMANENT MAGNET MOTOR

(75) Inventor: Takayoshi Matsuo, Brown Deer, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 886 days.

(21) Appl. No.: 12/113,148

(22) Filed: Apr. 30, 2008

(65) Prior Publication Data

US 2009/0273308 A1    Nov. 5, 2009

(51) Int. Cl.
*H02P 6/00*    (2006.01)

(52) U.S. Cl. .......... 318/400.1; 318/400.04; 318/400.06; 318/400.32; 318/700

(58) Field of Classification Search .......... 318/400.01, 318/400.02, 400.04, 400.06, 400.32, 700, 318/705, 722
See application file for complete search history.

(56) References Cited

U.S. PATENT DOCUMENTS

| | | | | |
|---|---|---|---|---|
| 4,250,435 A | * | 2/1981 | Alley et al. | 318/400.03 |
| 5,467,025 A | * | 11/1995 | Ray | 324/772 |
| 5,585,709 A | * | 12/1996 | Jansen et al. | 318/807 |
| 6,005,364 A | * | 12/1999 | Acarnley | 318/632 |
| 6,069,467 A | * | 5/2000 | Jansen | 318/802 |
| 6,163,127 A | | 12/2000 | Patel et al. | |
| 6,304,052 B1 | * | 10/2001 | O'Meara et al. | 318/700 |
| 6,456,030 B1 | * | 9/2002 | Masaki et al. | 318/700 |
| 6,492,788 B1 | | 12/2002 | Agirman et al. | |
| 6,501,243 B1 | * | 12/2002 | Kaneko et al. | 318/700 |
| 6,650,081 B2 | * | 11/2003 | Iwaji et al. | 318/700 |
| 6,731,083 B2 | * | 5/2004 | Marcinkiewicz | 318/254.2 |
| 7,211,984 B2 | | 5/2007 | Patel et al. | |
| 7,245,104 B2 | * | 7/2007 | Tomigashi et al. | 318/705 |
| 7,482,777 B2 | * | 1/2009 | Tomigashi | 318/807 |
| 7,501,776 B2 | * | 3/2009 | Lee et al. | 318/268 |
| 7,525,269 B2 | * | 4/2009 | Patel et al. | 318/432 |
| 7,602,139 B2 | * | 10/2009 | Ho | 318/806 |
| 7,816,876 B2 | * | 10/2010 | Tomigashi | 318/400.02 |

\* cited by examiner

*Primary Examiner* — Bentsu Ro
*Assistant Examiner* — Thai Dinh
(74) *Attorney, Agent, or Firm* — Fletcher Yoder, P.C.; Alexander R. Kuszewski; John M. Miller

(57) ABSTRACT

Systems and methods of controlling a permanent magnet motor without a mechanical position sensor are provided. In accordance with one embodiment, a motor control system includes an inverter configured to receive direct current (DC) power and output a power waveform to a permanent magnet motor, driver circuitry configured to receive control signals and drive the inverter based upon the control signals, a current sensor configured to determine a sampled current value associated with the power waveform, and control circuitry configured to generate the control signals based at least in part upon a comparison of a flux-producing component of the sampled current value and a flux-producing component of a command reference current value.

25 Claims, 6 Drawing Sheets

POSITION SENSORLESS CONTROL OF PERMANENT MAGNET MOTOR

BACKGROUND

The invention relates generally to control of a permanent magnet motor. More particularly, the invention relates to a technique for control of a permanent magnet motor without the use of a position sensor.

A three phase permanent magnet motor may be controlled by supplying three phase power to stator windings in the motor. Control schemes for a permanent magnet motor may involve tracking the rotor position of the motor. While mechanical position sensors coupled to the rotor may effectively provide motor position information, the presence of mechanical sensors may reduce the mechanical dependability of the system. Moreover, techniques without mechanical position sensors may require high frequency injection or back electromotive force (EMF) to identify the rotor position, may depend on upon the saliency of the motor, or may not function for both a surface-mount permanent magnet motor and an interior permanent magnet motor.

BRIEF DESCRIPTION

Embodiments of the invention include a motor control system and techniques for controlling a permanent magnet motor without a mechanical position sensor. In accordance with one embodiment, a motor control system may include an inverter configured to receive direct current (DC) power and output a power waveform to a permanent magnet motor. The system may include driver circuitry configured to receive control signals and drive the inverter based upon the control signals. A current sensor may be configured to determine a sampled current value associated with the power waveform, and control circuitry may be configured to generate the control signals based at least in part upon a comparison of a flux-producing component of the sampled current value and a flux-producing component of a command reference current value. The control circuitry may be configured to process the comparison of the flux-producing component of the sampled current value and the flux-producing component of the command reference current value using a proportional and integral regulator. The regulator may determine a torque-producing correction voltage based on the comparison of the flux-producing component of the sampled current value and the flux-producing component of the command reference current value.

In accordance with another embodiment, a method of controlling a permanent magnet motor includes causing an inverter to output a voltage waveform to a permanent magnet motor, sensing a current associated with the voltage waveform, and causing the inverter to output a corrected voltage waveform. The corrected voltage waveform may be based at least in part upon a comparison of a flux-producing component of the current associated with the voltage waveform and a flux-producing component of a command reference current. The inverter may be caused to output a corrected voltage waveform based at least in part upon a torque-producing correction voltage based on the comparison of the flux-producing component of the current associated with the voltage waveform and the flux-producing component of the command reference current. The inverter may be caused to output a corrected voltage waveform based at least in part upon a summation of the torque-producing correction voltage and a torque-producing command voltage.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
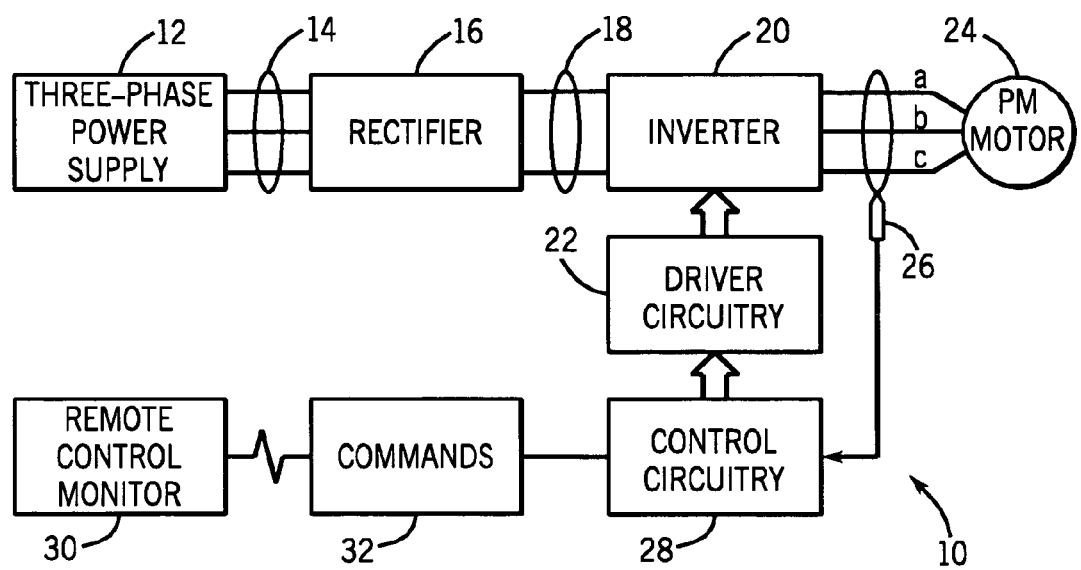
FIG. 1 is a diagram of an embodiment of a motor control system for controlling a permanent magnet motor.

FIG. 1 is a diagram for an embodiment of a motor control system 10 for controlling a permanent magnet motor without a mechanical position sensor. As discussed below, the motor control system 10 may include circuitry to control the motor using current feedback signals received from the motor, rather than a mechanical sensor. Moreover, the motor control system 10 may take the motor position into account without high frequency injection, without back EMF, and regardless of the saliency of the motor.

The motor control system 10 may include a three-phase power supply 12, which may represent, for example, a local generator or power from a main electrical grid, may supply three-phase power 14 at a standard frequency to a rectifier 16. The rectifier 16 may receive the three-phase power 14 and rectify the three-phase power 14 into direct current (DC) power 18. Alternatively, a DC battery may supply the DC power in lieu of the three-phase power supply 12 and the rectifier 16.

An inverter 20 receives the DC power 18. Driver circuitry 22 drives the inverter 20 to output three phases of electrical power (a, b, and c) to a permanent magnet motor 24, based on control signals received by driver circuitry 22. A sensor 26 may sample the current of the three phases of power (a, b, and c) supplied by the inverter 20 and provide current feedback signals to control circuitry 28. The three phases of electrical power (a, b, and c) cause stator windings in the permanent magnet motor 24 to produce a rotating stator magnetic field, which interacts with a magnetic field associated with permanent magnets located on a rotor. Based on the interactions between the stator magnetic field and the permanent magnetic field of the rotor, the rotor may then rotate accordingly.

It should be appreciated that the three phases of electrical power (a, b, and c) may be defined in a stationary, or stator, reference frame, referring to the three stators and represented along (a), (b), and (c) axes. However, to control the output torque and speed of the motor, the motor control circuitry 28 may perform calculations in a synchronous reference frame, which may be represented by a quadrature axis (q) and a direct axis (d). A mathematical transformation relates the two frames of reference. Because control calculations for obtaining a particular torque or speed may be simplified in the synchronous reference frame, precise direct-axis and quadrature-axis control voltages may be calculated in the synchronous reference frame and transformed into the equivalent three-phase voltages in the stator reference frame.

The control circuitry 28 may generally determine the appropriate control signals to send to the driver circuitry 22. A remote control monitor 30 may enable an operator or a remote computer to transmit commands 32, such as torque commands, to the control circuitry 28. Based upon the commands 32 received from the remote control monitor 30, as well as feedback from the sensor 26, the inverter module 20, the driver circuitry 22, and from calculations carried out within the control circuitry 28, the control circuitry 28 may determine the appropriate control signals to control the permanent magnet motor 24. After determining the appropriate motor control signals, the control circuitry 28 may send the control signals to the driver circuitry 22, which drives the inverter 20 based on the control signals, such that the three phase power is output to the permanent magnet motor 24.

To perform motor control operations, the control circuitry 28 may include an appropriate processor, such as a microprocessor or field programmable gate array, and may perform a variety of motor control calculations, including those techniques described herein. The control circuitry 28 may include a memory device or a machine-readable medium such as Flash memory, EEPROM, ROM, CD-ROM or other optical data storage media, or any other appropriate storage medium which may store data or instructions for carrying out the techniques discussed below.

Figure 2:
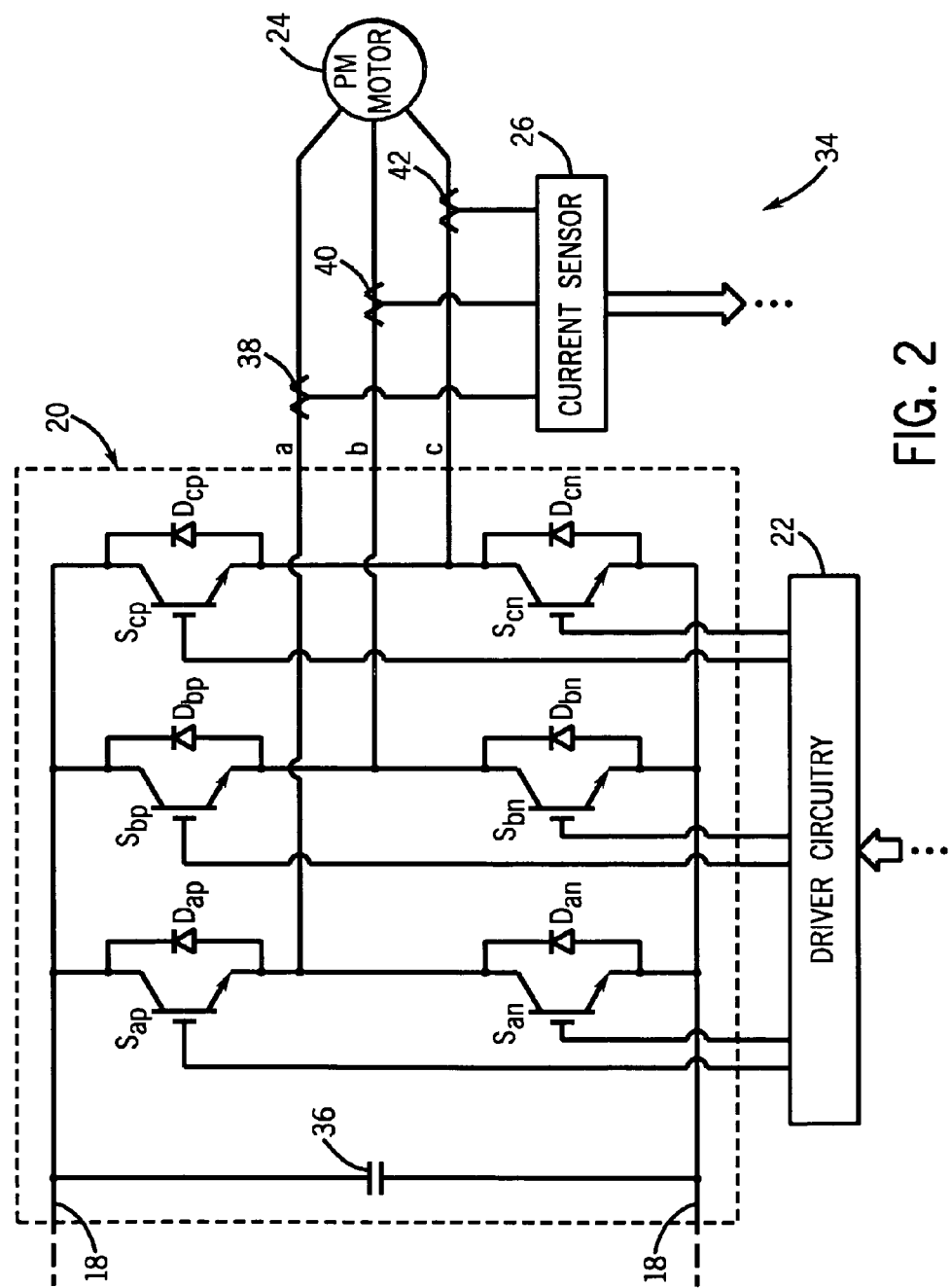
FIG. 2 is a diagram of an embodiment of an inverter of the motor control system of FIG. 1.

FIG. 2 is a diagram of an embodiment of a circuit 34 including the inverter 20 in the motor control system 10 of FIG. 1. As discussed above, the inverter 20 receives the DC voltage 18 as an input. A line conditioning element, such as a capacitor 36, may condition the DC voltage 18. The inverter 20 may include a plurality of insulated gate bipolar transistors (IGBTs), which act as power switches. Six IGBTs appear in the inverter 20, labeled $S_{ap}$, $S_{bp}$, $S_{cp}$, $S_{an}$, $S_{bn}$, and $S_{cn}$. Each of the IGBTs is joined in parallel to a corresponding power diode. Six power diodes appear in the inverter 20, labeled $D_{ap}$, $D_{bp}$, $D_{cp}$, $D_{an}$, $D_{bn}$, and $D_{cn}$.

The driver circuitry 22 may rapidly switch the IGBTs of the inverter 20 on and off, which may produce the output power waveform in three phases (a, b, and c) to the permanent magnet motor 24. The current sensor 26 samples each of the phases of the three-phase output power waveform as noted by numerals 38, 40, and 42, to obtain current feedback signals. As discussed further below, the current feedback signals may be employed to determine a position of the permanent magnet motor 24 in lieu of a mechanical motor position sensor, in accordance with an embodiment. Moreover, the current feedback signals may assist in taking the motor position into account without high frequency injection, without back EMF, and regardless of the saliency of the motor.

Figure 3:
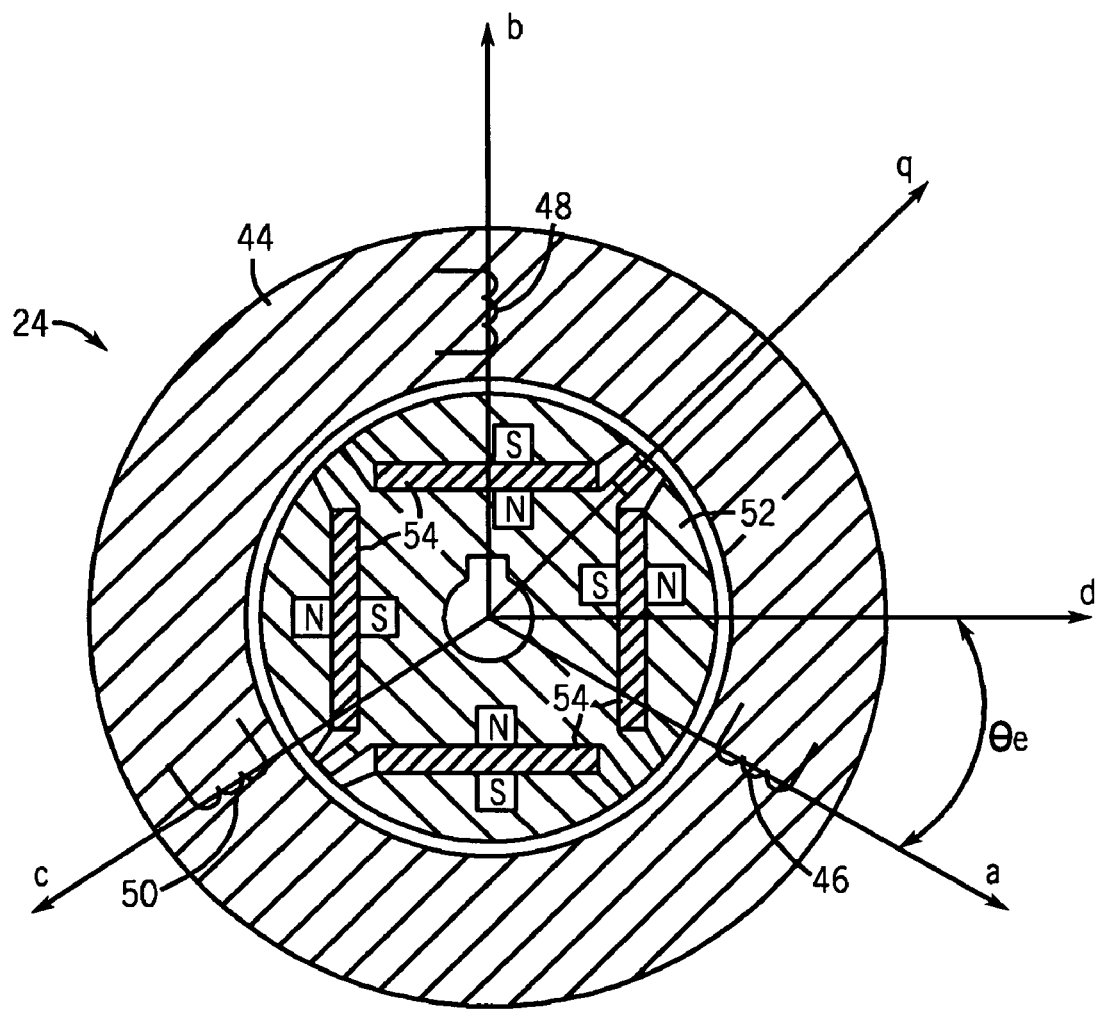
FIG. 3 is a simplified schematic view of an embodiment of the permanent magnet motor of FIG. 1.

FIG. 3 is a simplified view of an embodiment of the permanent magnet motor 24. The permanent magnet motor 24 includes conductive material 44, which may typically be ferromagnetic, holding three stator windings 46, 48, and 50. The stator windings 46, 48 and 50 receive the three-phase electrical power from the inverter 20, producing a stator magnetic field which rotates with the three-phase power.

A rotatable rotor 52 in the permanent magnet motor 24 includes a plurality of permanent magnets 54. The stator magnetic field interacts with a magnetic field caused by the permanent magnets 54 in the rotor 52, producing a torque upon the rotor 52. The permanent magnets 54 may be located within the rotor 52, in which case the permanent magnet motor 24 may be referred to as an interior permanent magnet motor. Alternatively, the permanent magnets 54 may be located on the surface of the rotor 52, in which case the permanent magnet motor 24 may be referred to as a surface permanent magnet motor. It should be noted that the technique described herein does not depend upon a saliency of the motor, and thus may function whether the permanent magnet motor 24 is an interior permanent magnet motor or a surface permanent magnet motor.

The simplified view of the permanent magnet motor 24 in FIG. 3 also illustrates a relationship between the stationary, or stator, reference frame and the synchronous reference frame. In the stationary reference frame, three axes (a, b, and c) are aligned respectively with the stator windings 46, 48, and 50. The stationary reference thus represents a frame of reference based upon the three phases of power supplied to the motor. In contrast, the synchronous reference frame represents a frame of reference based upon flux-producing and torque-producing components of electrical power in the permanent magnet motor 24. The synchronous reference frame includes a direct axis (d) and a quadrature axis (q). As should be appreciated, voltage or current along the direct axis (d) represents flux-producing voltage or current in the permanent magnet motor 24. Voltage or current along the quadrature axis (q) represents torque-producing voltage or current in the permanent magnet motor 24. As shown in FIG. 3, the stationary reference frame relates to the synchronous reference according to the angle $\theta_e$ between the direct axis (d) and the first stator axis (a). Through a mathematical transformation, values in the stationary reference frame may be converted to values in the synchronous reference frame, and vice versa.

Figure 4:
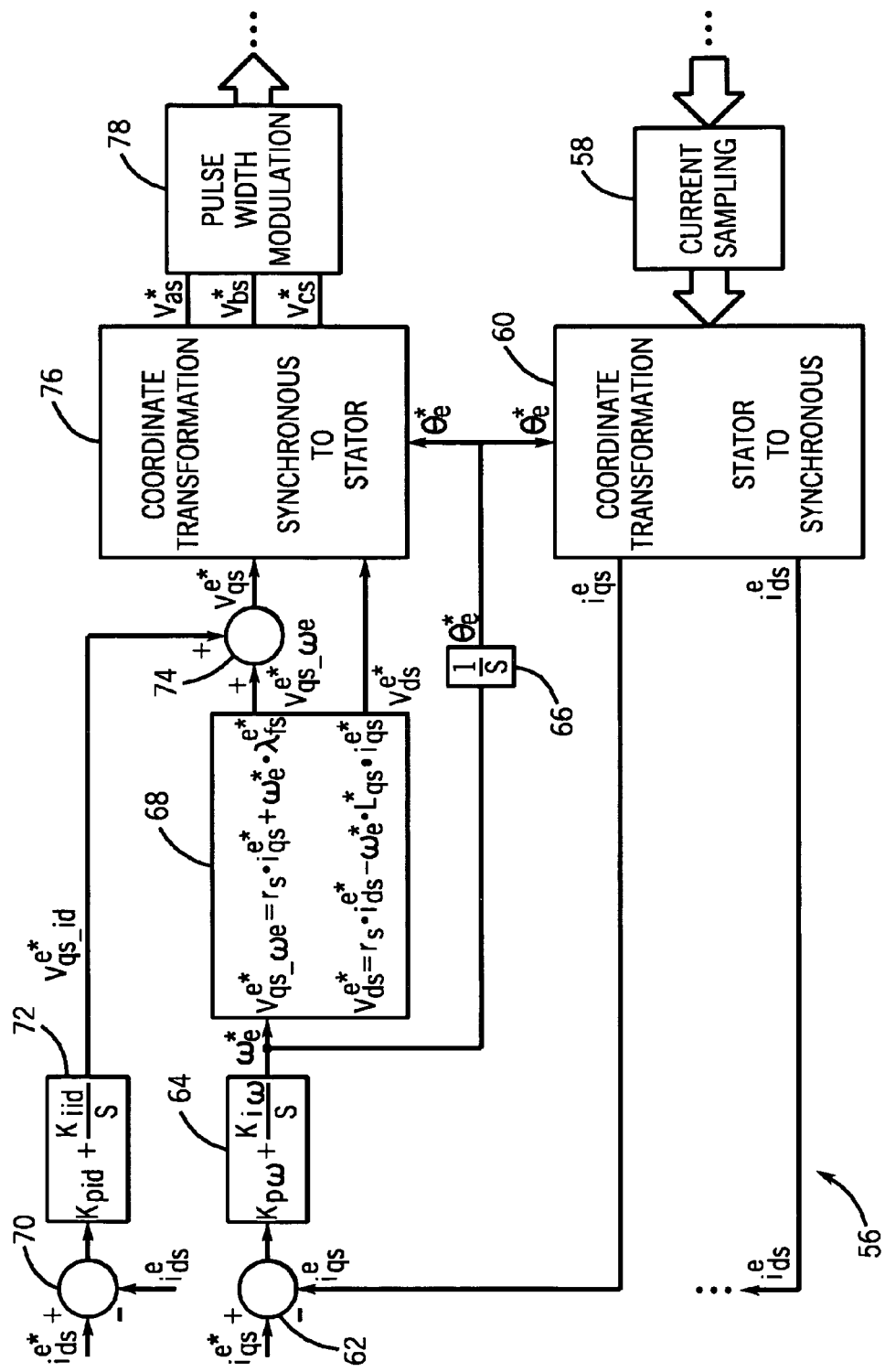
FIG. 4 is a dynamic block diagram depicting an embodiment for controlling the permanent magnet motor of FIG. 3.

FIG. 4 is a dynamic block diagram of an embodiment of a control scheme 56, which may form a component of a larger control scheme for controlling the permanent magnet motor 24 without a mechanical position sensor. The control scheme 56 may be implemented in the control circuitry 28. It should be appreciated that the control scheme 56 may represent only a partial control scheme implemented by the control circuitry 28, which may include multiple control stages for determining the control signals to send to the driver circuitry 22.

In the control scheme 56 of FIG. 4, a current sampling block 58 receives the current feedback signals from the current sensor 26. The current sampling block 58 determines the three-phase current that is output by the inverter 20, $i_{as}$, $i_{bs}$, and $i_{cs}$, which represent the sampled current in the stationary, or stator, reference frame. The stationary current values $i_{as}$, $i_{bs}$, and $i_{cs}$ enter a coordinate transformation block 60 in which, based upon the angular position of the stator magnetomotive force (MMF) $\theta_e^*$, the stationary current values $i_{as}$, $i_{bs}$, and $i_{cs}$ are transformed into equivalent current values in the synchronous reference frame, $i_{qs}^e$ and $i_{ds}^e$. The current $i_{qs}^e$ represents a q-axis feedback current and the current $i_{ds}^e$ represents a d-axis feedback current.

The q-axis feedback current $i_{qs}^e$ is compared against a q-axis reference current $i_{qs}^{e*}$ in a summer 62. The q-axis reference current $i_{qs}^{e*}$ represents a torque-producing component of a reference current, which may be determined by the control circuitry 28 based on the commands 32 to achieve a desired torque. As should be appreciated, the determination of the q-axis reference current $i_{qs}^{e*}$ may take place in a prior stage of a larger control scheme. The difference between the q-axis reference current $i_{qs}^{e*}$ and the q-axis feedback current $i_{qs}^e$, output by the summer 62, represents an error value, which feeds into a frequency regulator 64 represented by a proportional and integral (PI) regulator. As depicted in the control scheme 56, the frequency regulator 64 has a proportional gain $K_{p\omega}$ and an integral gain $K_{i\omega}$, outputting stator frequency $\omega_e^*$. The stator frequency $\omega_e^*$ enters a Laplace integral block 66, which outputs the angular position of the stator MMF $\theta_e^*$ for use in coordinate transformations.

The stator frequency $\omega_e^*$ also enters an equation block 68. The equation block 68 calculates a d-axis command voltage $V_{ds}^{e*}$ and a component of a q-axis command voltage based on stator frequency $\omega_e^*$, $V_{qs\_\omega e}^{e*}$, in accordance with the following equations:

$$V_{qs\_\omega e}^{e*} = r_s \cdot i_{qs} + \omega_e^* \cdot \lambda_{fs}^{e*} \quad (1)$$

$$V_{ds}^{e*} = r_s \cdot i_{ds}^{e*} - L_{qs}^* \cdot i_{qs}^{e*} \quad (2)$$

In equations (1) and (2) above, $i_{qs}^{e*}$ represents a q-axis reference current and $i_{ds}^{e*}$ represents a direct axis reference current. Additionally, $r_s$ represents stator resistance, $L_{sq}^*$ represents q-axis stator inductance, and $\lambda_{fs}^{e*}$ represents a coefficient of electromotive force (EMF) due to magnetic fields associated with the permanent magnets 54 in the rotor 52 of the permanent magnet motor 24. As will be discussed below, the component of the q-axis command voltage based on stator frequency $\omega_e^*$, $V_{qs\_\omega e}^{e*}$, represents only one component of a q-axis command voltage $V_{qs}^{e*}$. As such, the coefficient of EMF $\lambda_{fs}^{e*}$ need not be exactly precise, as feedback mechanisms in the control scheme 56 may dynamically correct for such imprecision.

Turning to view a summer 70 in the control scheme 56 of FIG. 4, a direct axis reference current $i_{ds}^{e*}$ may be compared to the direct axis feedback current $i_{ds}^{e}$, producing an error value. As should be appreciated, the direct axis reference current $i_{ds}^{e*}$ may be determined by the control circuitry 28 in a prior stage of a larger control scheme. The error value feeds into a d-axis current regulator 72, represented by a proportional and integral (PI) regulator having a proportional gain $k_{pid}$ and an integral gain $k_{iid}$.

The output of the d-axis current regulator 72 is a component of the q-axis command voltage based on a flux-producing current error, $V_{qs\_id}^{e*}$, which may effectively serve as a determination of the position of the rotor 52 in the permanent magnet motor 24. Combining the component of the q-axis command voltage based on a flux-producing current error, $V_{qs\_id}^{e*}$, with the component of the q-axis command voltage based on stator frequency $\omega_e^*$, $V_{qs\_\omega e}^{e*}$, in the summer 74, produces a q-axis command voltage $V_{qs}^{e*}$. This relationship is illustrated by the following equation:

$$V_{qs}^{e*} = V_{qs\_\omega e}^{e*} + V_{qs\_id}^{e*} \quad (3)$$

The q-axis command voltage $V_{qs}^{e*}$ and the d-axis command voltage $V_{ds}^{e*}$ may subsequently undergo a coordinate transformation in a coordinate transformation block 76, which outputs three-phase command voltages $v_{as}^*$, $v_{bs}^*$, and $v_{cs}^*$. Before being sent to the driver circuitry 22, the three-phase command voltages $v_{as}^*$, $v_{bs}^*$, and $v_{cs}^*$ may enter a pulse width modulation (PWM) block 78, which outputs PWM switching pulses for use by the driver circuitry 22 to drive the inverter 20.

Using the control scheme 56 of FIG. 4, the control circuitry 28 may thus adjust control signals to account for the position of the motor 24. With current feedback signals from the current sensor 26, the control scheme 56 takes negative feedback into account to adjust motor control. As should be appreciated, the control scheme 56 may account for the position of the motor 24 without a mechanical position sensor. Moreover, the control scheme 56 may take the motor 24 position into account without high frequency injection, without back EMF, and regardless of the saliency of the motor.

Figure 5:
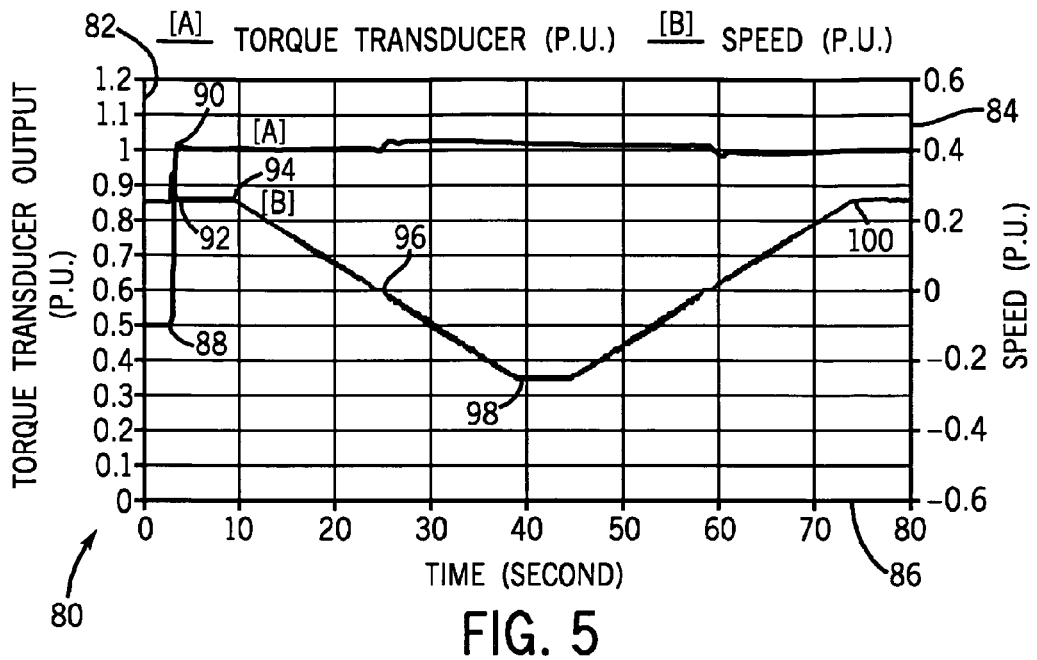
FIGS. 5 and 6 are graphs of torque and speed versus time from tests of a permanent magnet motor under the control scheme of FIG. 4.

Turning to FIG. 5, a plot 80 illustrates results of a test controlling the permanent magnet motor 24 according to the control scheme 56 of FIG. 4. In the plot 80, the tested permanent magnet motor 24 has ratings of 8.7 kW, 52.3 Hz, 460V, 20.9 A, and 1570 RPM, and 4 poles. The shaft speed for the permanent magnet motor 24 is controlled by dyne DC motor and the permanent magnet motor 24 is operated in a torque control mode. A first ordinate 82 represents a torque transducer output and a second ordinate 84 represents a speed feedback signal, each of which is represented in per unit (P.U.) values. As should be appreciated, the P.U. values represent a fraction of the rated values (e.g., 1.0 P.U. of speed represents 1570 RPM). An abscissa 86 represents time in units of seconds.

As illustrated in the plot 80, the torque reference is increased from 0.5 P.U. at point 88 to 1.0 P.U. at point 90. At point 92, the speed of the permanent magnet motor 24 remains a relatively constant 400 RPM (roughly 0.25 P.U.) at point 92 when the torque reference increases from 0.5 P.U. to 1.0 P.U. The speed is changed at a relatively constant ramp rate from 400 RPM at point 94 to 0 RPM at point 96, at which point there is a slight pause as the direction of rotation reverses, until reaching −400 RPM at point 98. After approximately 5 seconds, the speed is ramped back up from −400 RPM to 400 RPM at point 100. It should be noted that though the speed changes, the torque is maintained at approximately the full rated torque value, or 1.0 P.U.

Figure 6:
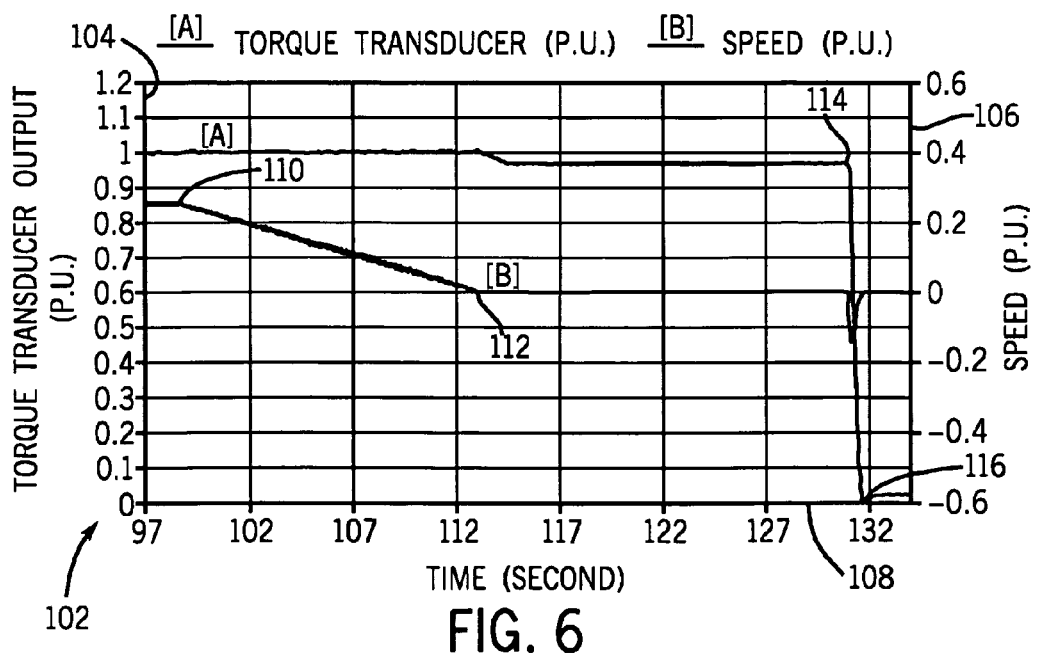

Turning to FIG. 6, a plot 102 represents results of another test controlling the permanent magnet motor 24 according to the control scheme illustrated in the control scheme 56 of FIG. 4. The characteristics of the permanent magnet motor 24 remain the same in the test illustrated by the plot 102 as in the test illustrated by the plot 80. A first ordinate 104 represents a torque transducer output and a second ordinate 106 represents a speed feedback signal, each of which is represented in per unit (P.U.) values. As described above, the P.U. values represent a fraction of the rated values (e.g., 1.0 P.U. of speed represents the rated speed of 1570 RPM). An abscissa 108 represents time in units of seconds.

As indicated in the plot 102, the torque transducer output is maintained at nearly 1.0 P.U., or approximately the full rated torque, when the speed is reduced from 400 RPM at point 110 to 0 RPM at point 112. At point 114, the torque reference is reduced from 1.0 P.U. to 0.0 P.U at point 116 and the torque transducer output follows the torque reference. The speed of the permanent magnet motor 24, which is controlled by the dyne DC motor, is briefly affected and restabilizes to 0 RPM.

Figure 7:
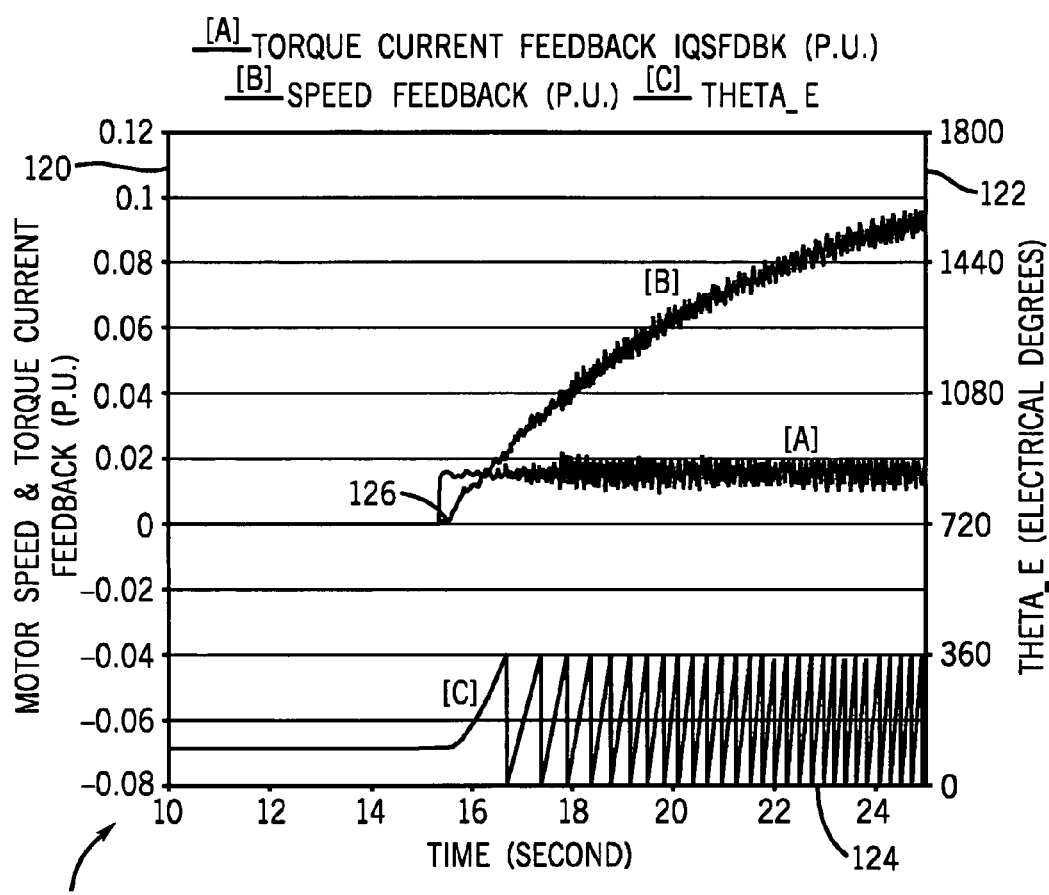
FIG. 7 is a graph of torque, speed, and angular position versus time from a test of a permanent magnet motor under the control scheme of FIG. 4.

Turning to FIG. 7, a plot 118 represents results of yet another test controlling the permanent magnet motor 24 according to the control scheme illustrated in the control scheme 56 of FIG. 4. It may be understood that the speed feedback in the plot 118 is a signal estimated from stator frequency $\omega_e^*$ of the control scheme 56. The characteristics of the permanent magnet motor 24 remain the same in the test illustrated by the plot 118 as in the tests illustrated by the plots 80 and 102. In the plot 118, a first ordinate 120 illustrates both motor speed and torque current feedback in per unit (P.U.) values, and a second ordinate 122 illustrates angular position of the stator MMF $\theta_e^*$ in units of degrees. As described above, the P.U. values represent a fraction of the rated values (e.g., 1.0 P.U. of speed represents the rated speed of 1570 RPM). An abscissa 124 represents time in units of seconds. As indicated in the plot 118 at point 126, the torque reference is increased from 0 P.U. to 0.02 P.U. Despite the very low torque reference, the permanent magnet motor 24 successfully starts to rotate at point 126. As motor speed slowly increases, the angular position of the stator MMF $\theta_e^*$ varies appropriately in time to correspond to the increase in motor speed feedback.

Thus, as shown by the plot 80 of FIG. 5, the plot 102 of FIG. 6, and the plot 118 of FIG. 7, despite the lack of a mechanical position sensor, and without using high speed injection or back EMF, the control scheme 56 provides effective control over the permanent magnet motor 24. Additionally, the control scheme 56 does not rely on a particular saliency of the permanent magnet motor 24, but still remains effective.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor control system comprising:
control circuitry configured to generate control signals to control a permanent magnet motor based at least in part upon a comparison of a flux-producing current component of a power waveform supplied to the permanent magnet motor and a flux-producing component of a command reference current value and to determine the angular position of the stator magneto-motive force based at least in part on a comparison of a torque-producing current component of the power waveform and a torque-producing component of the command reference current value.

2. The system of claim 1, wherein the control circuitry is configured to determine a stator frequency based at least in part on the comparison of the torque-producing current component of the power waveform and the torque-producing component of the command reference current value and wherein the control circuitry is configured to determine the stator magneto-motive force based at least in part on the stator frequency.

3. The system of claim 1, wherein the control circuitry is configured to determine a torque-producing correction voltage based on the comparison of the flux-producing current component of the power waveform and the flux-producing component of the command reference current value.

4. The system of claim 3, wherein the control circuitry is configured to generate the control signals based at least in part upon a summation of the torque-producing correction voltage and a torque-producing command voltage.

5. The system of claim 4, wherein the control circuitry is configured to determine the torque-producing command voltage based at least in part upon a stator frequency and a torque-producing component of the command reference current value.

6. The system of claim 1, wherein the control circuitry is configured to generate the control signals based at least in part upon the following relationships, where $V_{ds}^{e*}$ represents a flux-producing command voltage, $V_{qs\_\bar{\omega}e}^{e*}$ represents a component of a torque-producing command voltage based on stator frequency, $i_{qs}^{e*}$ represents the torque-producing component of the command reference current value, $i_{ds}^{e*}$ represents the flux-producing component of the command reference current value, $r_s$ represents stator resistance, $L_{sq}^*$ represents torque-producing stator inductance, $\lambda_{fs}^{e*}$ represents a coefficient of electromotive force (EMF) due to magnetic fields associated with permanent magnets of the permanent magnet motor, and $\omega_e^*$ represents stator frequency:

$$V_{qs\_\bar{\omega}e}^{e*} = r_s \cdot i_{qs}^{e*} + \omega_e^* \cdot \lambda_{fs}^{e*} \tag{1}$$

$$V_{ds}^{e*} = r_s \cdot i_{ds}^{e*} - L_{qs}^* \cdot i_{qs}^{e*}. \tag{2}$$

7. The system of claim 6, wherein the control circuitry is configured to generate the control signals based at least in part upon the following relationship, where $V_{qs}^{e*}$ represents a torque-producing command voltage, $V_{qs\_\omega e}^{e*}$ represents the component of a torque-producing command voltage based on stator frequency, and $V_{qs\_id}^{e*}$ represents a component of the torque-producing command voltage based on the comparison of the flux-producing component of the sampled current value and the flux-producing component of the command reference current value:

$$V_{qs}^{e*} = V_{qs\_\omega e}^{e*} + V_{qs\_id}^{e*}.$$

8. A method of controlling a permanent magnet motor comprising:
causing an inverter to output a voltage waveform to a permanent magnet motor;
sensing a current associated with the voltage waveform;
determining a flux-producing component of the current based at least in part on an angular position of a stator magneto-motive force;
causing the inverter to output a corrected voltage waveform based at least in part upon a comparison of the flux-producing component of the current and a flux-producing component of a command reference current; and
determining the angular position of the stator magneto-motive force based at least in part upon the a comparison of a torque-producing current component of the power waveform and a torque-producing component of the command reference current.

9. The method of claim 8, wherein the inverter is caused to output a corrected voltage waveform based at least in part upon a torque-producing correction voltage based on the comparison of the flux-producing component of the current and the flux-producing component of the command reference current.

10. The method of claim 9, wherein the inverter is caused to output a corrected voltage waveform based at least in part upon a summation of the torque-producing correction voltage and a torque-producing command voltage.

11. The method of claim 10, wherein the torque-producing command voltage is based at least in part upon a stator frequency and a torque-producing component of the command reference current value.

12. The method of claim 8, wherein the inverter is caused to output a corrected voltage waveform based at least in part upon the following relationships, where $V_{ds}^{e*}$ represents a flux-producing command voltage, $V_{qs\_\omega e}^{e*}$ represents a component of a torque-producing command voltage based on stator frequency, $i_{qs}^{e*}$ represents the torque-producing component of the command reference current, $i_{ds}^{e*}$ represents the flux-producing component of the command reference current value, $r_s$ represents stator resistance, $L_{sq}^*$ represents torque-producing stator inductance, $\lambda_{fs}^{e*}$ represents a coefficient of electromotive force (EMF) due to magnetic fields associated with permanent magnets of the permanent magnet motor, and $\omega_e^*$ represents stator frequency:

$$V_{qs\_\bar{\omega}e}^{e*} = r_s \cdot i_{qs}^{e*} + \omega_e^* \cdot \lambda_{fs}^{e*} \tag{1}$$

$$V_{ds}^{e*} = r_s \cdot i_{ds}^{e*} - L_{qs}^* \cdot i_{qs}^{e*}. \tag{2}$$

13. The method of claim 12, wherein the inverter is caused to output a corrected voltage waveform based at least in part upon the following relationship, where $V_{qs}^{e*}$ represents a torque-producing command voltage, $V_{qs\_\omega e}^{e*}$ represents the component of a torque-producing command voltage based on stator frequency, and $V_{qs\_id}^{e*}$ represents a component of the torque-producing command voltage based on the comparison of the flux-producing component of the sampled current value and the flux-producing component of the command reference current value:

$$V_{qs}^{e*} = V_{qs\_\omega e}^{e*} + V_{qs\_id}^{e*}.$$

14. A method of controlling a motor comprising:
receiving a current reference value;
sampling a power waveform supplied to a permanent magnet motor to obtain a feedback current value;
determining a torque-producing correction voltage based at least in part on a comparison of a flux-producing component of the feedback current value and a flux-producing component of the command reference current value;
determining a command voltage value based at least in part on the torque-producing correction voltage; and
determining an angular position of a stator magneto-motive force of the permanent magnet motor based at least in part on a comparison of a torque-producing current component of the power waveform and a torque-producing component of the command reference current value.

15. The method of claim 14, wherein sampling the power waveform comprises sampling the power waveform supplied to a surface permanent magnet motor.

16. The method of claim 14, wherein the method does not involve high frequency injection in the power waveform supplied to the permanent magnet motor.

17. The method of claim 14, wherein the method does not involve injection of back electromotive force (EMF) into the permanent magnet motor.

18. A motor control system comprising:
control circuitry configured to generate control signals for controlling a permanent magnet motor without the use of a motor position sensor and without regard to a saliency of the permanent magnet motor, wherein the control signals are based at least in part upon feedback from a power waveform supplied to the permanent magnet motor, wherein the control circuitry is configured to determine a position of the permanent magnet motor based at least in part on a comparison of a torque-producing component of the current reference value and a torque-producing component of the feedback from the power waveform.

19. The system of claim 18, wherein the control circuitry is configured to generate the control signals without high frequency injection.

20. The system of claim 18, wherein the permanent magnet motor is a surface permanent magnet motor.

21. The system of claim 18, wherein the permanent magnet motor is an interior permanent magnet motor.

22. The system of claim 18, wherein the control circuitry is configured to generate the control signals without involving back electromotive force (EMF) into the permanent magnet motor.

23. A machine readable storage medium tangibly embodying a sequence of instructions executable by the machine to perform a method, the method comprising:
receiving a current reference value;
receiving a feedback current value; and
determining a position of the permanent magnet motor without the use of a mechanical position sensor based at least in part on a comparison of a torque-producing component of the current reference value and a torque-producing component of the feedback current value.

24. The machine readable storage medium of claim 23, wherein the method comprises determining the position of the permanent magnet motor based at least in part on a stator frequency determined by processing the comparison of the torque-producing component of the current reference value and the torque-producing component of the feedback current value in a proportional and integral regulator.

25. The machine readable storage medium of claim 23, wherein the method comprises determining the position of the permanent magnet motor without regard to a saliency of the motor.

* * * * *